(12) United States Patent
Lombardi

(10) Patent No.: US 7,642,215 B2
(45) Date of Patent: Jan. 5, 2010

(54) CHEMICALLY-RESISTANT SHELTER COATINGS

(76) Inventor: John Lombardi, 831 N. Camino Miramonte, Tucson, AZ (US) 85716

( * ) Notice: Subject to any disclaimer, the term of this patent is extended or adjusted under 35 U.S.C. 154(b) by 53 days.

(21) Appl. No.: 11/779,239

(22) Filed: Jul. 17, 2007

(65) Prior Publication Data

US 2008/0153690 A1 Jun. 26, 2008

Related U.S. Application Data

(63) Continuation of application No. 10/931,121, filed on Aug. 30, 2004, now Pat. No. 7,259,122.

(60) Provisional application No. 60/498,980, filed on Aug. 29, 2003.

(51) Int. Cl.
*B01J 31/18* (2006.01)
*C09B 47/04* (2006.01)

(52) U.S. Cl. .......................................... 502/159; 422/1
(58) Field of Classification Search ................. 502/159; 422/1

See application file for complete search history.

(56) References Cited

U.S. PATENT DOCUMENTS

| | | | | |
|---|---|---|---|---|
| 4,482,624 A * | 11/1984 | Arney et al. | ................. | 430/138 |
| H223 H * | 3/1987 | Seiders et al. | ................. | 422/1 |
| 5,346,670 A * | 9/1994 | Renzoni et al. | ................ | 422/52 |
| 5,616,532 A * | 4/1997 | Heller et al. | ................. | 502/242 |
| 5,705,622 A * | 1/1998 | McCapra | .................... | 536/23.1 |
| 6,063,849 A * | 5/2000 | Morris et al. | ................ | 524/432 |
| 7,291,584 B2 * | 11/2007 | Schlingloff et al. | .......... | 510/376 |
| 2002/0009599 A1 * | 1/2002 | Welch et al. | .............. | 428/423.1 |
| 2003/0096131 A1 * | 5/2003 | Beavers et al. | .............. | 428/522 |
| 2008/0171803 A1 * | 7/2008 | Lombardi | ................... | 523/122 |

OTHER PUBLICATIONS

Iliev et al, Journal of Molecular Catalysis A: Chemical 184 (2002) 121-130.*
Wasserman, et al, Journal of the American Chemical Society, 1967, 89(12), 3073-3075.*

* cited by examiner

*Primary Examiner*—Roy King
*Assistant Examiner*—Yun Qian
(74) *Attorney, Agent, or Firm*—Dale F. Regelman; Quarles & Brady LLP

(57) ABSTRACT

A shelter coating comprising a photocatalyst capable of generating singlet oxygen from ambient air. The shelter coating may optionally include a singlet oxygen scavenger.

13 Claims, 12 Drawing Sheets

300

13C NMR SPECTRUM OF AQUEOUS THIODIGLYCOL (TDG) / TINOLUX BBS (AlPc) SOLUTION PRIOR TO VISIBLE LIGHT IRRADIATION

¹³C NMR SPECTRUM OF AQUEOUS TDG / TINOLUX SOLUTION AFTER 15 MINUTES IRRADIATION

13C NMR SPECTRUM OF AQUEOUS TDG / TINOLUX / TiO2 SOLUTION IRRADIATED FOR 10 MINUTES

¹³C NMR SPECTRUM OF CES AND ALUMINUM PHTHALOCYANINE CATALYST PRIOR TO IRRADIATION
CES/DMSO - d6/NO IRRADIATION/NO 02

$^{13}$C NMR SPECTRUM OF CES AND ALUMINUM
PHTHALOCYANINE CATALYST PRIOR TO IRRADIATION
CES/AlPc/DMSO/30 MIN IRRADIATION/O2/LIGHT YELLOW FILTER

US 7,642,215 B2

CHEMICALLY-RESISTANT SHELTER COATINGS

CROSS-REFERENCE TO RELATED APPLICATIONS

This application is a Continuation Application claiming priority from a U.S. Utility application Ser. No. 10/931,121 filed Aug. 30, 2004, which claimed priority from a U.S. Provisional Application having Ser. No. 60/498,980 filed Aug. 29, 2003.

GOVERNMENT LICENSE RIGHTS

The U.S. Government has a paid-up license in this invention and the right in limited circumstances to require the patent owner to license others on reasonable terms as provided by the terms of "Lightweight and Low Cost Flexible Structure Textiles" U.S. Army Phase I Small Business Innovation Research Grant Contract No. DAAD16-03-C-0011.

FIELD OF THE INVENTION

The invention relates to chemically-resistant shelter coatings.

BACKGROUND OF THE INVENTION

Exposure to toxic chemical and biological agents ("CBAs") is a growing concern to both military and civilian organizations alike. Areas of enhanced vulnerability include assemblies of persons, whether military or civilian. One such scenario includes military personnel assembled within one or more tents and/or portable shelters.

In order to mitigate the harmful effects of an exposure to CBA agents, many military shelters are constructed from fabrics which include one or more polymeric materials exhibiting barrier properties to one or more toxic agents. Many of these fabrics comprise, for example, fluoropolymers such a polytetrafluoroethylene ("PTFE"). One such composite material comprises Teflon coated Kevlar. While such composites demonstrate acceptable barrier properties, these CBA barrier shelter fabrics are expensive and require multiple manufacturing operations to join various fabric segments. The high costs of materials in combination with high manufacturing costs limit the availability of such prior art fabrics for widespread use.

As a result, most real-world military shelters are not made from such fabrics. Rather, current shelters are formed using materials having inferior CBA resistance. For example, forces of the United States of America typically utilize a General Purpose Shelter Fabric ("GP Fabric") manufactured from cloth coated with polyvinyl chloride ("PVC"). GP Fabric is relatively inexpensive and affords soldiers adequate protection against inclement weather including rain, snow, wind, and dust storms. Shelters made from GP Fabric, however, offer minimal CBA protection. Such prior art shelters require an additional M28 Saranex liner to impart acceptable CBA barrier properties. As those skilled in the art will appreciate, use of such liners adds to the overall weight, cost, and complexity, of the shelter.

Applicant's invention includes a more convenient, lower cost means of providing CBA resistance comprising disposing a waterborne CBA barrier coating directly onto either the interior, exterior, or both, of shelters made from GP Fabric. Applicant's method uses conventional coating methods, such as knife coating, spray coating, calendaring, and the like. Waterborne coatings are desirable because of inherent low toxicity and low flammability properties. Applicant's coating solutions rapidly and uniformly spread over the shelter surfaces, including the seams, thereby producing a continuous CBA barrier film after drying. Applicant's coating effectively "hardens" the shelter, i.e. enhances its CBA barrier properties.

As those skilled in the art will appreciate, in order for any barrier coating to be effectively repel toxic agents, that coating must exhibit a high degree of mechanical integrity. In addition, that coating must adhere well to the GP Fabric substrate such that the coating neither tears nor delaminates from the fabric. Poor mechanical strength and/or poor adhesion greatly increase the likelihood of forming cracks and other coating defects that facilitate passage of toxic chemicals into the shelter.

SUMMARY OF THE INVENTION

In certain embodiments, Applicant's invention includes a shelter coating which includes polyvinyl alcohol in combination with polyethyleneimine. In certain embodiments, Applicant's shelter coating includes a photocatalyst capable of producing singlet oxygen. In certain embodiments, Applicant's shelter coating includes a singlet oxygen scavenger.

DETAILED DESCRIPTION OF THE PREFERRED EMBODIMENTS

Figure 1:
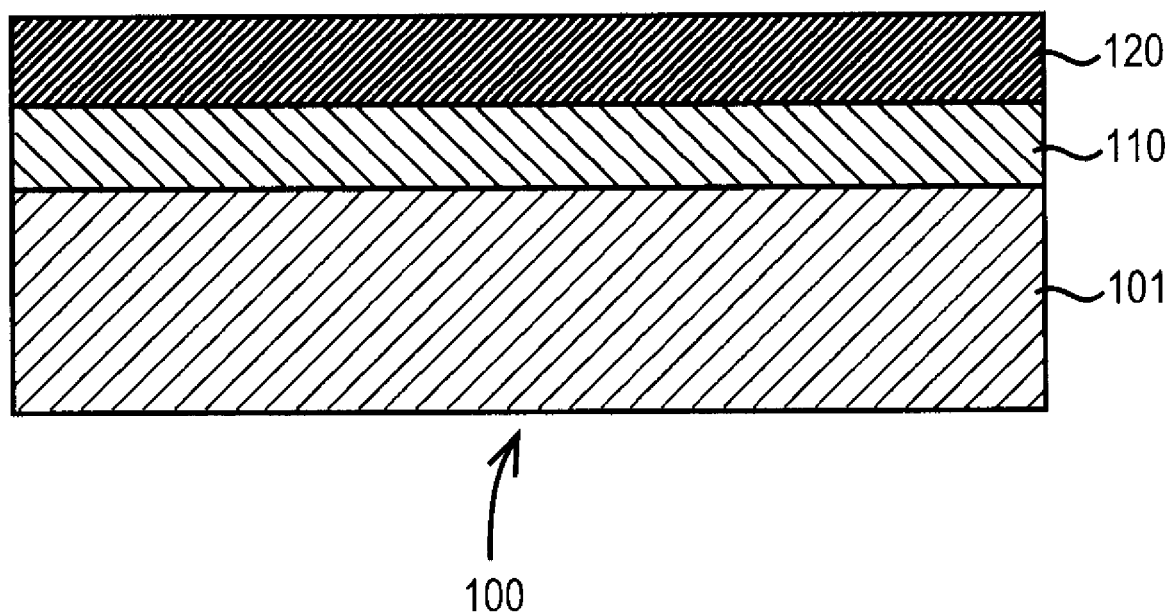
FIG. 1 is a block diagram showing a first embodiment of Applicant's shelter coating disposed on a substrate.

Referring to the illustrations, like numerals correspond to like parts depicted in the Figures. The invention will be described as embodied in a fabric used to manufacture, inter alia, tents. The following description of Applicant's composition is not meant, however, to limit Applicant's invention to fabrics used to form tents. Rather, Applicant's shelter coating can be applied to garments, vehicles, conventional structures such as dwellings, office buildings, warehouses, and the like.

In certain embodiments, Applicant's coating comprises one or more polymers having structure I. In various embodiments, R1 is selected from the group consisting of hydrogen, alkyl, phenyl, aryl, alkoxyalkyl, and the like. In various embodiments, R2 is selected from the group consisting of hydrogen, alkyl, phenyl, aryl, alkoxyalkyl, and the like. In certain embodiments, Applicants' waterborne coating composition includes Polymer I wherein R3 is hydrogen, i.e. polyvinyl alcohol ("PVOH"). In certain embodiments, Applicants' waterborne coating composition includes Polymer I wherein R3 is acetyl. In certain embodiments, Applicants' waterborne coating composition includes Polymer I wherein R3 is selected from the group consisting of hydrogen, acetyl, and combinations thereof.

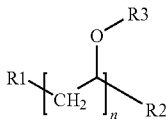

The CBA barrier properties of PVOH have been known for over 20 years and are well documented throughout the literature. Further, PVOH is nontoxic, inexpensive, and is available in commercial quantities. In certain embodiments, of Applicant's composition, Polymer I further includes certain co-polymers, such as for example poly(ethylene-co-vinyl alcohol), poly(vinyl alcohol-co-vinyl amine), mixtures thereof, and the like. In certain embodiments of Applicant's composition, Polymer I further includes cellulose and/or cellulose derivatives, such as for example carboxymethyl cellulose.

Pure PVOH coatings do not adhere well to the surface of GP Fabric. Such lack of adhesion likely results from, inter alia, the high concentration of plasticizers, flame retardants, pigments, and other additives disposed in the PVC component of the fabric. The additives impart certain desired optical, mechanical, and thermal stability properties to the fabric facilitating its use for shelter construction. Many of these properties are specified under one or more Government Specifications and Standards. In addition to imparting desirable properties, such additives, however, lower the energy of the shelter surface making it difficult for waterborne coatings to uniformly spread and strongly adhere upon the fabric.

Applicant has found that blends of PVOH and one or more polymers having structure II significantly enhance the adhesion between one or more PVOH CBA barrier layers and GP Shelter Fabric.

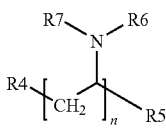

In certain embodiments, Applicant's coating composition comprises Polymer II wherein R4 and R5 are each independently selected from the group consisting of hydrogen, alkyl, aryl, phenyl, alkoxyalkyl, and the like. In certain embodiments, Applicant's coating composition comprises Polymer II wherein R6 and R7 are each independently selected from the group consisting of hydrogen, alkyl, aryl, phenyl, alkoxyalkyl, and the like. In certain embodiments, Applicant's coating composition comprises Polymer II wherein R6 and R7 are hydrogen, i.e., wherein Polymer II comprises Polyethyleneimine ("PEI").

In certain embodiments, Applicant's coating composition comprises Polymer III wherein R8 is selected from the group consisting of hydrogen, alkyl, aryl, phenyl, alkoxyalkyl, and the like. In certain embodiments, Applicant's coating composition comprises Polymer III wherein X— is selected from the group consisting of fluoride, chloride, bromide, iodide, acetate, benzoate, propionate, and the like.

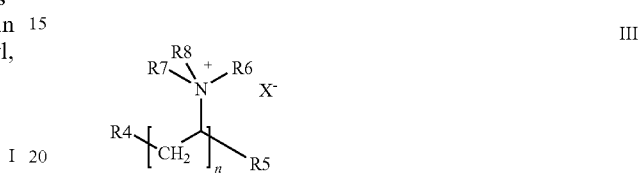

Applicant has found that PEI and/or blends of PEI can be applied as primer layers onto the GP Fabric followed by application of one or more PVOH barrier coating layers. This multi-layer composition coating imparts the desired durable, CBA resistant PVOH coatings onto the GP Fabric.

In certain embodiments, Applicant's composition includes PEI having a number averaged molecular weight between about 250 Daltons to about 750,000 Daltons. In certain embodiments, Applicant's composition comprises Lupasol WF sold in commerce by the BASF Corp./Colorants & Process Chemicals Div.

Referring now to FIG. 1, composite material 100 includes substrate 101. In certain embodiments, substrate 101 comprises GP Fabric. First layer 110 is disposed over one side of substrate 101. In certain embodiments, layer 110 comprises one or more Polymers II and/or III. In certain embodiments, layer 110 comprises PEI. In certain embodiments, layer 110 comprises a mixture of PEI and one or more salts of PEI.

In certain embodiments, first layer 110 is directly knife coated neat, or alternatively dissolved separately in one or more solvents and disposed upon the GP Shelter fabric substrate. The one or more solvents comprise, for example, ethanol, water, and combinations thereof. A solution comprising one or more Polymers II and/or III can be applied to the GP Fabric using conventional techniques, including spraying, dipping, calendaring, roll coating, and the like.

Alternatively, layer 110 comprises a blend of one or more polymeric materials. In certain embodiments, layer 110 comprises one or more Polymers I and/or one or more Polymers II, and/or one or more Polymers III. In certain embodiments, an aqueous mixture of one or more Polymers I in combination with one or more Polymers II and/or III, and then applied to the fabric 101 as a primer layer.

In certain embodiments, layer 110 comprises a blend of PVOH and PEI. In certain embodiments, layer 110 comprises a blend having PEI/PVOH, wherein the PEI is present in an amount exceeding about 60 weight percent. Applicant has found that addition of PVOH to PEI considerably enhances the durability of both the primer layer and of the final the multi-layer coating, and produces a tougher, more tear resistant multi-layer coating. As those skilled in the art will appreciate, such coatings for shelters are often subjected to abrasion from both mechanical forces, i.e. handling, as well as the environmental factors, i.e. dust, hail, wind, and the like.

Subsequently, layer 120 comprising one or more Polymers I is then disposed over first layer 110. In certain embodiments, Applicant's coating layer 120 includes Polymer I wherein R3 is hydrogen, i.e. PVOH. In certain embodiments, Applicant's coating layer 120 includes Elvanol 71-30, supplied by Dupont Industrial Polymers, wherein about 99% of the R3 groups are hydrogen.

Figure 2:
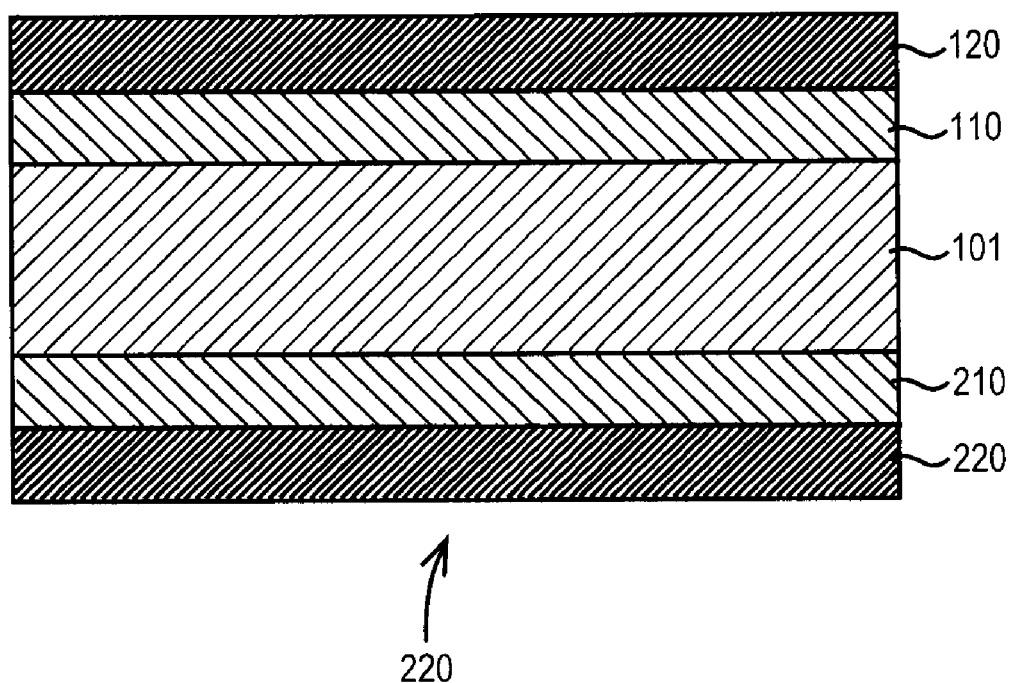
FIG. 2 is a block diagram showing a second embodiment of Applicant's shelter coating disposed on a substrate.

Referring now to FIG. 2, composite 200 includes a multi-layer coating on both sides of the fabric substrate. In the illustrated embodiment of FIG. 2, first layer 110 is disposed over a first side of substrate 101. First layer 210 is disposed over a second side of substrate 101. First layer 210 is applied to substrate 101 in the manner described above for first layer 110.

In certain embodiments, first layer 110 and first layer 210 are the same. In certain embodiments, first layer 110 and first layer 210 differ. In certain embodiments, one of layers 110 or 210 comprises one or more Polymers II. In certain embodiments, one of layers 110 or 210 comprises one or more Polymers III.

In certain embodiments, layer 210 comprises a blend of one or more Polymers I in combination with one or more Polymers II, and/or one or more Polymers III.

In certain embodiments, either first layer 110 or first layer 210 comprises substantially only PEI while the other first layer comprises a blend of PEI and PVOH. In certain embodiments, first layer 110 and first layer 210 both comprises PEI/PVOH blends. In certain embodiments, those PEI/PVOH blends are substantially the same. In other embodiments, the two PEI/PVOH primer layers comprise blends having differing PVOH/PEI ratios.

In the illustrated embodiment of FIG. 2, second layer 220 is disposed over first layer 210. In certain embodiments, second layer 120 and second layer 220 are the same. In certain embodiments, second layer 120 and second layer 220 differ.

Figure 3:
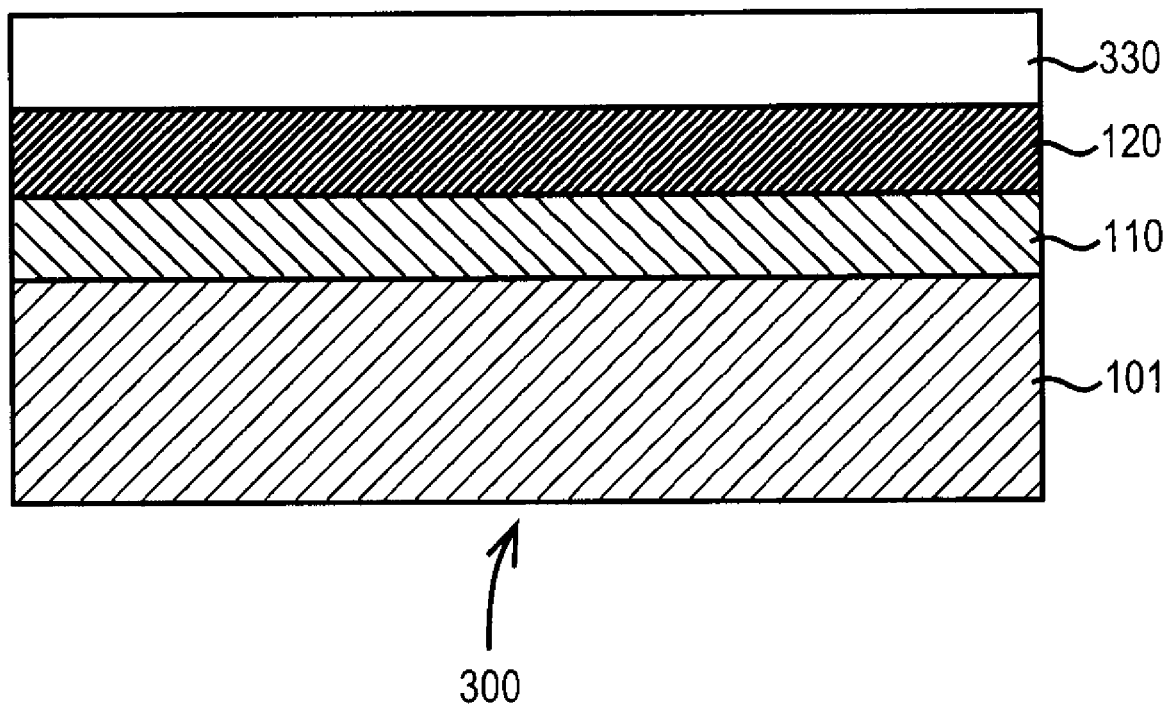
FIG. 3 is a block diagram showing a third embodiment of Applicant's shelter coating disposed on a substrate.

Referring now to FIG. 3, composite 300 includes fabric substrate 101, first layer 110, second layer 120, and third layer 330 disposed over second layer 120. Third layer 330 comprises a hydrophobic material. By "hydrophobic material," Applicant's mean a material that is not water soluble and that is substantially impermeable to water. In certain embodiments, layer 330 comprises polyisobutylene. In certain embodiments, layer 330 comprises natural rubber. In certain embodiments, layer 330 comprises polyisoprene. In certain embodiments, layer 330 comprises butyl rubber. In certain embodiments, layer 330 comprises succinated polyisobutylene.

Figure 4:
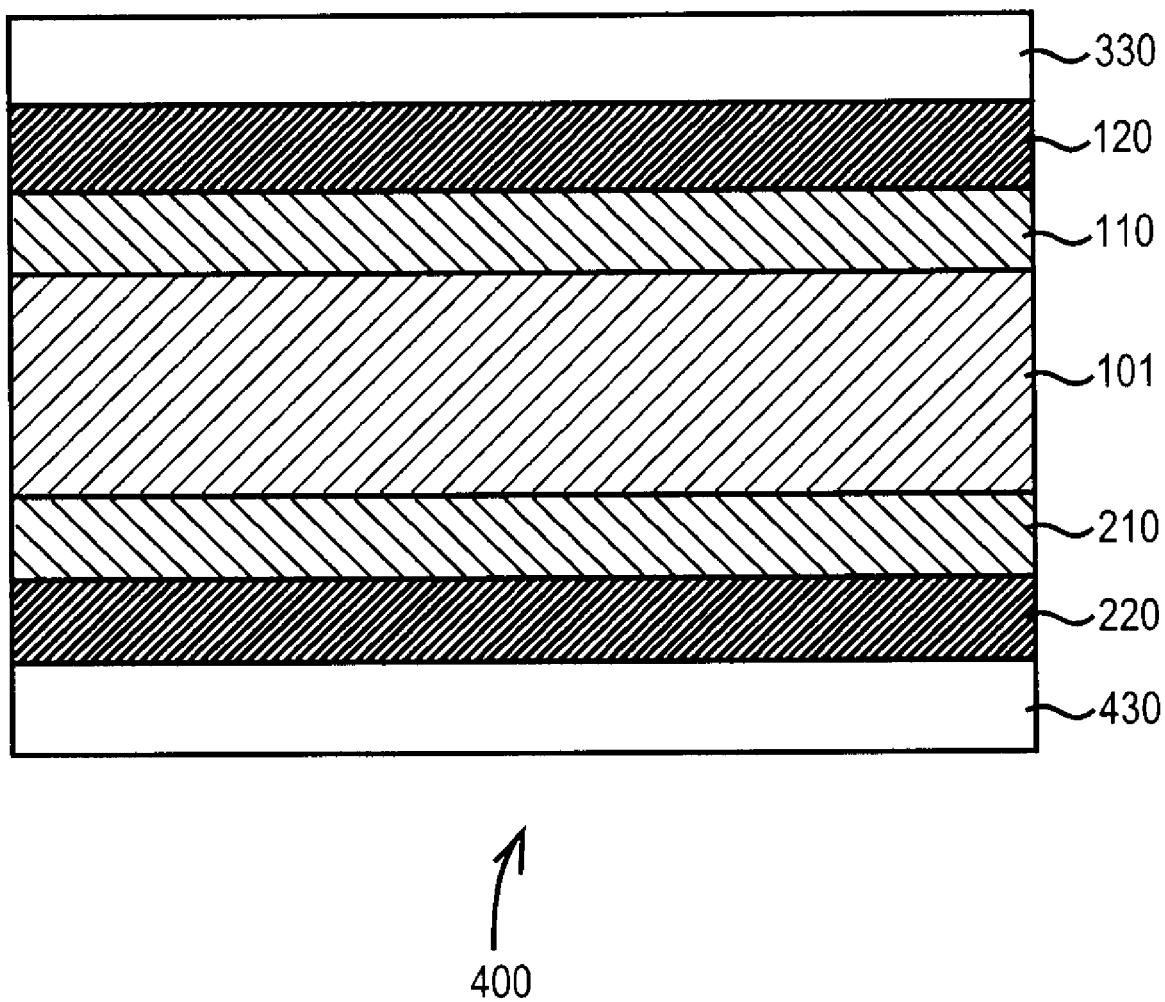
FIG. 4 is a block diagram showing a fourth embodiment of Applicant's shelter coating disposed on a substrate.

Referring now to FIG. 4, composite 400 includes fabric substrate 101, first layer 110, first layer 210, second layer 120, second layer 220, third layer 330, and third layer 430. Third layer 430 comprises a hydrophobic material. In certain embodiments, layer 430 comprises polyisobutylene. In certain embodiments, layer 430 comprises natural rubber. In certain embodiments, layer 430 comprises polyisoprene.

In certain embodiments, substrate 101 (FIGS. 1, 2, 3, 4) is permeable to ambient air. In certain embodiments, composite 100 (FIG. 1) is permeable to ambient air. In certain embodiments, composite 200 (FIG. 2) is permeable to ambient air. In certain embodiments, composite 300 (FIG. 3) is permeable to ambient air. In certain embodiments, composite 400 (FIG. 4) is permeable to ambient air.

Figure 5:
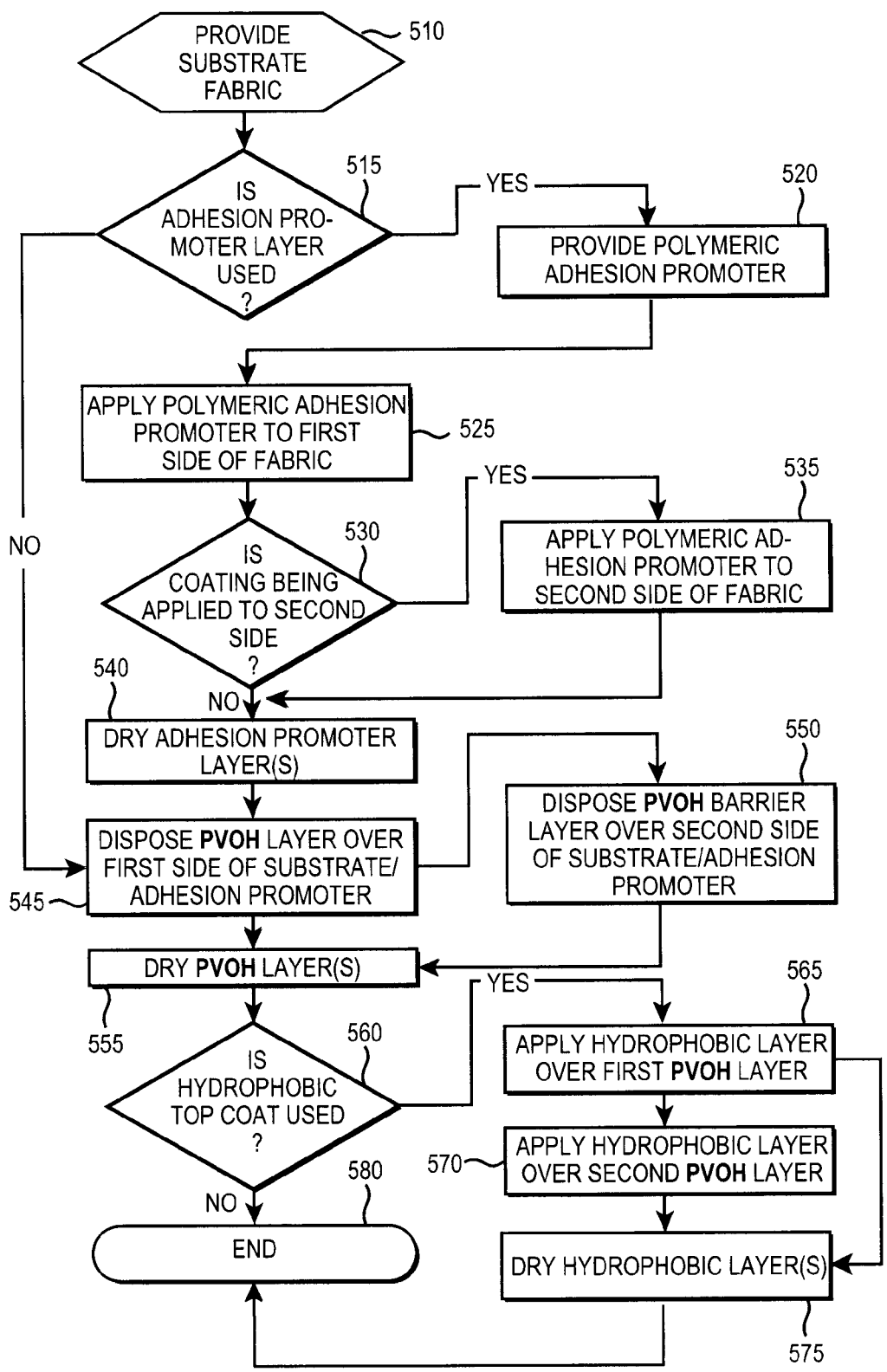
FIG. 5 is a flow chart summarizing the steps of Applicant's method to prepare his shelter coating.

FIG. 5 summarizes the steps of Applicant's method to prepare a composite comprising a shelter substrate and a plurality of layers disposed thereover. Referring now to FIG. 5, in step 510 Applicant's method provides a shelter substrate. In certain embodiments, the substrate comprises canvas. In certain embodiments, the substrate comprises a PVC film. In certain embodiments, the substrate comprises one or more natural materials, such as cotton, wool, and the like. In certain embodiments, the substrate comprises one or more synthetic materials, such as PVC, polyethylene, polypropylene, nylon, polyester, and the like. In certain embodiments, the substrate comprises one or natural materials in combination with one or more synthetic materials.

In certain embodiments, the shelter substrate comprises the walls of a room. In certain embodiments, the shelter substrate comprises the body of a vehicle, where that vehicle is selected from the group comprising a passenger vehicle, a commercial vehicle, a military vehicle, such as for example a HUMVEE, and the like.

In step 515, Applicant's method determines if an adhesion promoter is used. If no adhesion promoter is used, the method transitions from step 515 to step 545. Alternatively, if an adhesion promoter is used, then the method transitions to step 520 wherein the method provides one or more polymeric adhesion promoters. As described above, such one or more adhesion promoters are selected from Polymer I, Polymer II, Polymer III, and combinations thereof. In certain embodiments, the adhesion promoter comprises a blend of PEI and PVOH.

In step 525, Applicant's method disposes the adhesion promoter onto a first side of the fabric of step 510. Step 525 includes use of conventional equipment and methods. In certain embodiments, a liquid or viscous adhesive promoter is spread across the fabric without the use of a diluent.

In other embodiments, the adhesion promoter of step 520 is mixed in one or more liquids. In certain embodiments, that liquid is water. The adhesion promoter/diluent mixture is then sprayed, calendared, rolled onto the fabric. In certain embodiments, the fabric is dipped into the adhesion promoter/diluent mixture.

In step 530, Applicant's method determines if a second side of the fabric will be coated. If Applicant's method determines that a second side of the fabric will not be coated, then the method transitions to step 540. If Applicant's method determines that a second side of the fabric will be coated, then the method transitions to step 535 wherein a second adhesion promoter is disposed on the second side of the fabric using the techniques described above. In certain embodiments, the first adhesion promoter applied in step 525 is the same as the second adhesion promoter applied in step 535. In certain embodiments, the first adhesion promoter applied in step 525 differs from the second adhesion promoter applied in step 535.

Applicant's method transitions from step 535 to step 540 wherein the adhesion promoter layer(s) are dried. In certain embodiments, step 540 includes drying the one or two adhesion promoter layers in an air oven at about 80° C. Applicant's method transitions from step 540 to step 545 wherein the method disposes a PVOH layer over a first one of the adhesion promoter layers. In certain embodiments, step 545 includes dissolving PVOH in water, and applying that aqueous solution over a first adhesion promoter layer. Conventional application methods are used. For example, the PVOH solution can be sprayed, calendared, rolled onto the adhesion promoter layer. In certain embodiments, one side of the fabric is dipped into the PVOH solution.

If only one side of the fabric is being coated, then Applicant's method transitions from step 545 to step 555. If both sides of the fabric are being coated, then Applicant's method transitions from step 545 to step 550 wherein a PVOH layer is formed over the second adhesion promoter layer. Once again, conventional application methods are used. For example, the PVOH solution can be sprayed, calendared, rolled onto the adhesion promoter. In certain embodiments, the entire fabric is dipped into the PVOH solution.

Applicant's method transitions from step 550 to step 555 wherein the one or two PVOH layers are dried. In certain embodiments, step 555 includes drying the one or two adhesion promoter layers in an air oven at about 80° C.

In step 560, Applicant's method determines if a third, hydrophobic layer will be used. If a third layer is not used, then Applicant's method transitions from step 560 to step 580 and ends. Alternatively, if a hydrophobic top layer is used, then Applicant's method transitions from step 560 to step 565 wherein a hydrophobic layer is disposed over a first PVOH layer. In certain embodiments, the hydrophobic layer comprises a polyisobutylene.

If only a single side of the fabric is being coated, then Applicant's method transitions from step 565 to step 575 wherein the single hydrophobic layer is dried. If both sides of the fabric are being coated, then Applicant's method transitions from step 565 to step 570 wherein the method disposes a hydrophobic layer over the second PVOH layer. Applicant's method transitions from step 570 to step 575 wherein the one or two hydrophobic layers are dried. In certain embodiments, step 575 includes drying the one or two adhesion promoter layers in an air oven at about 80° C. Applicant's method transitions from step 575 to step 580 and ends.

Referring again to FIG. 1, Applicant has been discovered that a first layer 110 comprising PEI and a second layer 120 comprising PVOH, wherein layers 110 and 120 in the aggregate have a combined thickness of about 0.3 mil impart comparable barrier properties compared to the Army's conventional M28 Saranex liner when tested for its permeability towards liquid 1,6-dichlorohexane ("DCH") mustard gas simulant molecule.

Figure 6:
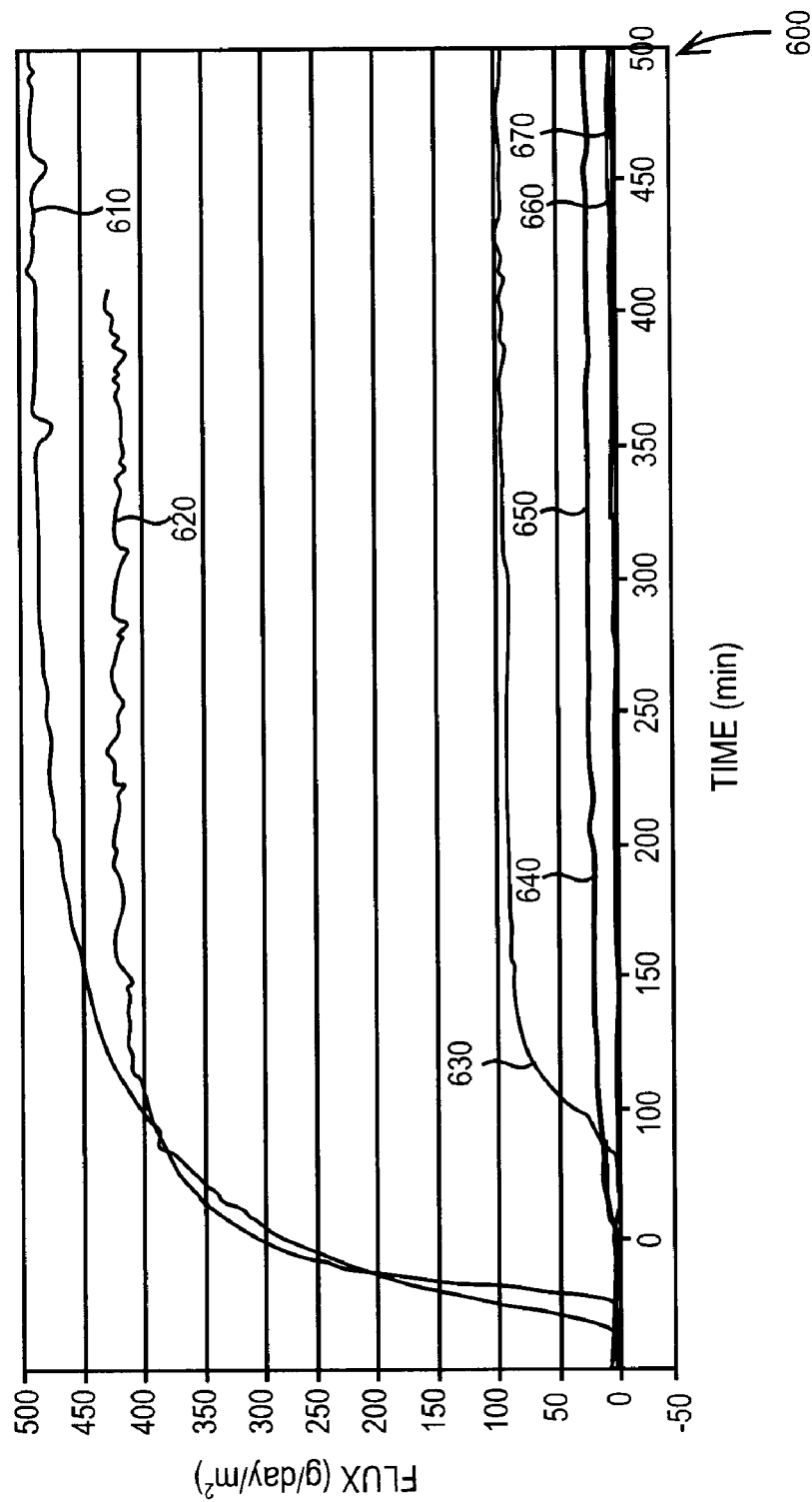
FIG. 6 is a graph showing the effectiveness of Applicant's shelter coating in limiting the permeability of a first mustard gas simulant.

Referring to FIG. 6, graph 600 graphically depicts the flux of DCH through various barrier composites. Curve 610 shows the flux of DCH through an untreated control comprising only GP Fabric. Curve 620 shows the flux of DCH through 13 mil thick butyl rubber. Curve 630 shows the flux of DCH through PTFE coated Kevlar CBPS fabric. Curve 640 shows the flux of DCH through Clay filled PVOH nanocomposite coated GP Fabric. Curve 650 shows the flux of DCH through GP fabric coated with Polidene polyvinylidene chloride (PVDC). Curve 660 shows the flux of DCH through an GP Fabric in combination with a Saranex M28 liner. Curve 670 shows the flux of DCH through an GP Fabric coated with Applicants' coating composition comprising a PEI/PVOH first layer comprising about 66 weight percent PEI and a second PVOH layer.

FIG. 6 shows that GP Fabric coated with Applicant's coating composition has barrier properties to a mustard gas analog equal to better than the barrier properties exhibited by any prior art coating, including a prior art device comprising a separate liner. In fact, use of a PEI/PVOH barrier layer disposed over GP Fabric of equal thickness to Saranex would give an estimated DCH breakthrough time of greater than 1350 hours, assuming a Fickian Diffusion (D) where DCH migrates through the sample width (X) according to Equation (i).

$$X = (2Dt)^{1/2} \quad (i)$$

Figure 7:
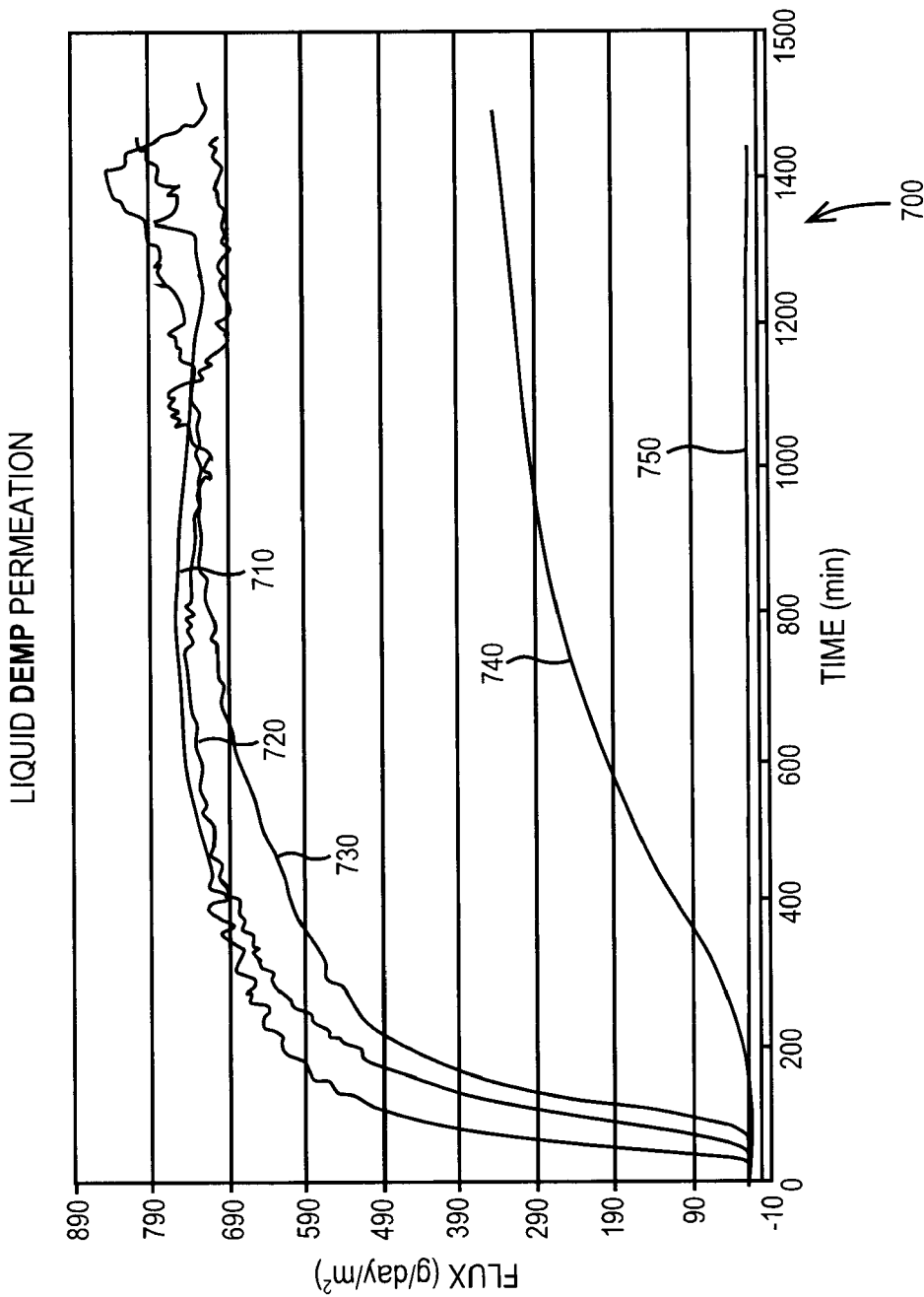
FIG. 7 is a graph showing the effectiveness of Applicant's shelter coating in limiting the permeability of a second mustard gas simulant.

Referring now to FIG. 7, graph 700 shows the flux of Diethyl methane phosphate ("DEMP") through various barrier composites. DEMP is used as a toxic nerve agent analog. Curve 710 shows the flux of DEMP through an untreated control comprising only GP Fabric. Curve 720 shows the flux of DEMP through GP Fabric coated with M 3-11-031. Curve 730 shows the flux of DEMP through an GP Fabric coated with UA-9-031. Curve 740 shows the flux of DEMP through an GP Fabric coated Applicant's PEI/PVOH coating composition. Curve 750 shows the flux of DEMP through an GP Fabric coated with PTFE and Kevlar.

Attempts to enhance the CBA barrier properties of polymers via the incorporation of reactive nanoparticulate calcium, magnesium, titanium, or aluminum oxide fillers have met with limited success. Even though these oxide fillers rapidly deactivate chemical warfare agents, they are generally not easily regenerated and hence are consumed shortly after contact with chemical agents. Enzymes too have been shown to be effective against organophosphate nerve agents but have limited stability when dispersed within a coating and are easily poisoned by mustard agent. This suggests that many of these fillers are only effective against certain types of chemical agents and have little efficacy against other toxic compounds or biological pathogens.

Better CBA decontamination fillers are therefore needed which are effective against a wide spectrum of toxic compounds and biological pathogens. Further these fillers should be rapidly regenerable, maintenance-free and have long service lifetimes.

Applicant has developed fillers comprising zinc, aluminum, germanium, copper or silicon substituted phthalocyanine ("Pc") complexes which become highly photoactive upon exposure to visible light and generate singlet oxygen from ambient air. Originally developed as a storage stable, environmentally friendly, sunlight activated bleaching agents for institutional textile laundering use in remote locations, the these phthalocyanine complexes rapidly generate excited singlet state oxygen (typically within a few nanoseconds) after exposure to light. Singlet oxygen has been shown to be a very effective oxidizing agent capable of decomposing both toxic chemicals as well as numerous biological pathogens/microbial species. The high chemical stability of these complexes enables them to continually produce singlet oxygen over a long time period without losing their activity. Furthermore, the phthalocyanines are inexpensive, widely available, and are of low toxicity making them attractive self-regenerating candidate catalysts for CBA agent deactivation. Applicant has found these compounds to be effective for oxidizing CBA simulant compounds.

In certain embodiments, one or more Pc complexes are directly grafted onto fabric, added as a filler uniformly dispersed within one or more layers 110 (FIG. 1), 120 (FIG. 1), 210 (FIG. 2), 330 (FIG. 3), and/or 430 (FIG. 4), attached to the surface of the PVOH blend barrier coating, and/or blended with silicone emulsion that is subsequently coated onto the PVOH barrier surface, or merely upon fabric or hardware surfaces.

In certain embodiments, layer 330 and/or layer 430 comprises an alkyl polysiloxane, such as for example polydimethylsiloxane, or polysiloxane polymer having fluorinated alkyl groups within its structure. Such siloxanes comprise an attractive matrix polymer for Pc complexes due to the polymer's water repellency, chemical and environmental stability, as well as its high permeability to oxygen. This permeability facilitates the generation of singlet oxygen within the silicone film that is then capable of CBA agent decontamination. Alternatively, the silicone coating can be introduced onto the surface by deposition of silicone oligomers onto the surface followed by thermal, radiation, or photocuring means. For example the silicone oligomer could have reactive vinyl ether, ester or amide functionality (e.g. vinyl ether, acrylate, methacrylate, acrylamide, or methacrylamide functionality) which could be blended with other vinyl monomers and photoinitiator and subsequently UV photocured.

In certain embodiments, layer 330 and/or layer 430 are formed using a silicone urethane oligomer sold in commerce by Sartomer Company (Exton, Pa.) under the trade name CN 990 siliconized urethane acrylate. The starting material does not comprise a pure urethane polymer. Rather, this material comprises an oligomer having reactive acrylate end groups and a midsection having alkyl urethane groups with polydimethylsiloxane grafted onto the oligomer.

Upon polymerization, the material forms a urethane backbone with the silicone chains migrating to the coating surface to provide dimethylsiloxane polymer surface groups. The urethane component provides toughness and tear resistance to the coating. UV photocuring offers the advantage of being capable of rapidly & continuously coating silicones upon these surfaces. In addition, using such a UV treatment results in the silicone layer being grafted, and subsequently covalently attached upon the PVOH surface by free radical means. Hence Pc filled polymer coatings and surface grafted materials will exhibit significant resistance towards CBA agents and enhance the barrier & self-decontaminating properties of Pc treated materials.

Irradiating aqueous solutions of these Pc complexes using visible light from a polychromatic Xe solar simulation lamp has shown them to be effective photocatalysts for oxidizing CBA simulants, particularly when compared to conventional Titanium Dioxide photocatalyst nanoparticles.

In particular, there is excellent overlap between the most intense wavelength regions of the solar spectrum and the very strongly absorbing Q band (550-720 nm) of the phthalocyanine complex. In embodiments of Applicant's shelter coating composition comprising one or more of such phthalocyanine complexes, Applicant's shelter composition generates singlet oxygen using Reaction Scheme "A", below. Upon absorption of light, the phthalocyanine undergoes electronic excitation to its singlet state followed by electron reorganization to form the excited triplet state. Triplet phthalocyanine transfers energy to ambient triplet oxygen to form reactive singlet oxygen. The singlet oxygen generated ($^1O_2$), is the reactive species capable of oxidizing and decontaminating CBAs.

Reaction Scheme "A"

$$\text{phthalocyanine} + \text{light} \rightarrow {}^1\text{phthalocyanine} \rightarrow {}^3\text{phthalocyanine}$$

$${}^3\text{phthalocyanine} + {}^3O_2 \rightarrow \text{phthalocyanine} + {}^1O_2$$

In various embodiments, Applicant's composition includes one or more Pc complexes, including sulfonated, sulfonyl chloride, substituted sulfonamide and carboxylated phthalocyanines (Pc) comprising aluminum, zinc, germanium, silicon, and mixtures thereof. Sulfonyl chloride and substituted sulfonamide phthalocyanine complexes are particularly attractive since these organosulfur moieties enable the stable covalent attachment of the Pc complex to a wide variety of surfaces. These complexes are easily dispersible within Applicant's barrier material or grafted onto its surface. Further these compounds also have the added advantage that they have a high affinity for aluminum surfaces which may enable them to be used in future aircraft paints. By "Pc complex," Applicant means a compound having structure IV:

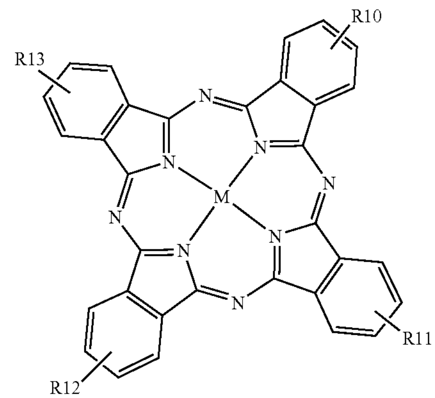

IV wherein M is selected from the group consisting of Zn, Si, Ge, Cu, Al, and mixtures thereof, and wherein R10 is selected from the group consisting of $SO_3H$, $CO_2H$, $SO_2Cl$, and CHO, and wherein R11 is selected from the group consisting of $SO_3H$, $CO_2H$, $SO_2Cl$, and CHO, and wherein R12 is selected from the group consisting of $SO_3H$, $CO_2H$, $SO_2Cl$, and CHO, and wherein R13 is selected from the group consisting of $SO_3H$, $CO_2H$, $SO_2Cl$, and CHO. All of these Pc complexes exhibit significant absorption in the visible light spectrum ($\lambda_{MAX} \approx 680$ nm) and generate singlet oxygen in high quantum yields at these wavelengths.

In certain embodiments, Applicant's Pc sulfonyl chloride compound is first reacted with a diamine in, for example, dichloromethane and pyridine in a 1:1 molar ratio. This reaction forms a Pc having sulfonamide linkages and reactive pendant primary amine groups. After removing the pyridinium chloride precipitate by-product by, for example, filtration, the aminated alkyl sulfonamido Pc derivative is then attached to the coated fabric. In certain embodiments, this attachment reaction includes reacting cyanuric chloride with a portion or all of the pendent primary amines at 0° C. in an acetone-water mixture. Using these reaction conditions, only the monosubstituted amine on cyanuric chloride product is formed. The remaining two Cl groups on the substituted cyanuric compound remain available for reaction with the fabric hydroxyl groups, i.e. the hydroxyl groups of the PVOH coating. In other embodiments, the pendent amine is reacted with a compound which forms divinyl sulfone intermediates upon heating.

In certain embodiments, Applicant covalently attaches the Pc to mineral filler surfaces, such as for example clay and/or zeolites. In these embodiments, the sulfonyl chloride Pc derivative is reacted with aminopropyl silane ester in dichloromethane containing pyridine. After removal of the pyridinium hydrochloride precipitate from the reaction mixture, the mineral surfaces are then treated with a solution of the silyl ester alkyl sulfonamide Pc product. Upon solvent removal, the silyl ester condenses with the surface hydroxyl groups forming stable covalent linkages between the Pc photocatalyst and the filler surface.

In certain embodiments, Applicant's Pc complex is used in combination with titanium dioxide nanoparticles which are also photoreactive. In certain embodiments, Applicant's shelter coating includes a plurality of Pc complexes, wherein each of those Pc complexes has structure IV.

In certain embodiments, Applicant disperses the one or more Pc complexes within Applicant's shelter coating described above. In certain embodiments, Applicant attaches one or more Pc complexes to the surface of Applicant's coating. In certain embodiments for example, one or more Pc complexes are covalently bonded with the hydroxyl moieties comprising the PVOH component of Applicant's coating. In one such embodiment, an $SO_2Cl$ pendent group on Applicant's Pc complex is reacted with a pendent hydroxyl moiety on a PVOH molecule to form an PVOH polymer comprising the adduct Pc —$SO_2$— PVOH.

In other embodiments, Applicant pretreats ceramic filler (e.g. bentonite or montmorillonite clay, natural and synthetic zeolites, titanium dioxide, aluminum oxide, silica, or silica gel adsorbent) with the Pc, and then disperses the treated filler within the barrier coating. Bentonite clay is especially well known for its ability to significantly absorb and serve as an efficient photocatalyst support for photobleaching laundry formulations manufactured by Sud-Chemie Corp. in Austria. These fillers provide a heterogeneous catalytic support for the Pc complex and can potentially enhance its photoactivity and/or the mechanical properties of the coating. The amount of phthalocyanine treatment level for the clay and zeolites will range from about 0.1% upward to the maximum sorption amount recommended by the filler manufacturer. In certain embodiments, organosilane coupling agents promote covalent adhesion between the phthalocyanines and polymeric fabric.

Experiment I

Experiment I demonstrates the efficacy of metal phthalocyanine compounds as CW Agent decontamination photocatalysts. In this Experiment I, Applicant performed visible light photooxidation of aqueous thiodiglycol (TDG) solutions containing Tinolux BBS, a commercially available tetrasulfonated aluminum phthalocyanine photocatalyst obtained from Ciba Specialty Chemicals (High Point, N.C.). TDG is a water soluble simulant for HD mustard agent (2,2'-bis(chloroethyl)sulfide).

As those skilled in the art will appreciate, Tinolux BBS has a blue color. In certain embodiments, Applicant's polymeric fabric coating includes one or more inert dyes, such as for example, tartrazine yellow #5, in combination with Tinolux BBS. By adjusting the ratio of these materials, Applicant can adjust the color of the phthalocyanine additive package. More specifically, a wide variety of green colored materials can be formulated.

Irradiations were carried out on 0.2 M solutions of thiodiglycol in $D_2O$ with (~$5\times10^{-4}$ M) and without phthalocyanine catalyst present. Approximately 1 ml of the appropriate solution was transferred to an NMR tube and irradiated with the output of a 150 watt Xe arc lamp filtered by a Corning 3-69 transmitting filter (wavelengths>510 nm transmitted). Analysis of the irradiated solutions was accomplished by $^1$H-NMR, $^{13}$C-NMR, and TLC. These analyses show that a single detectable photoproduct formed.

Figure 8:
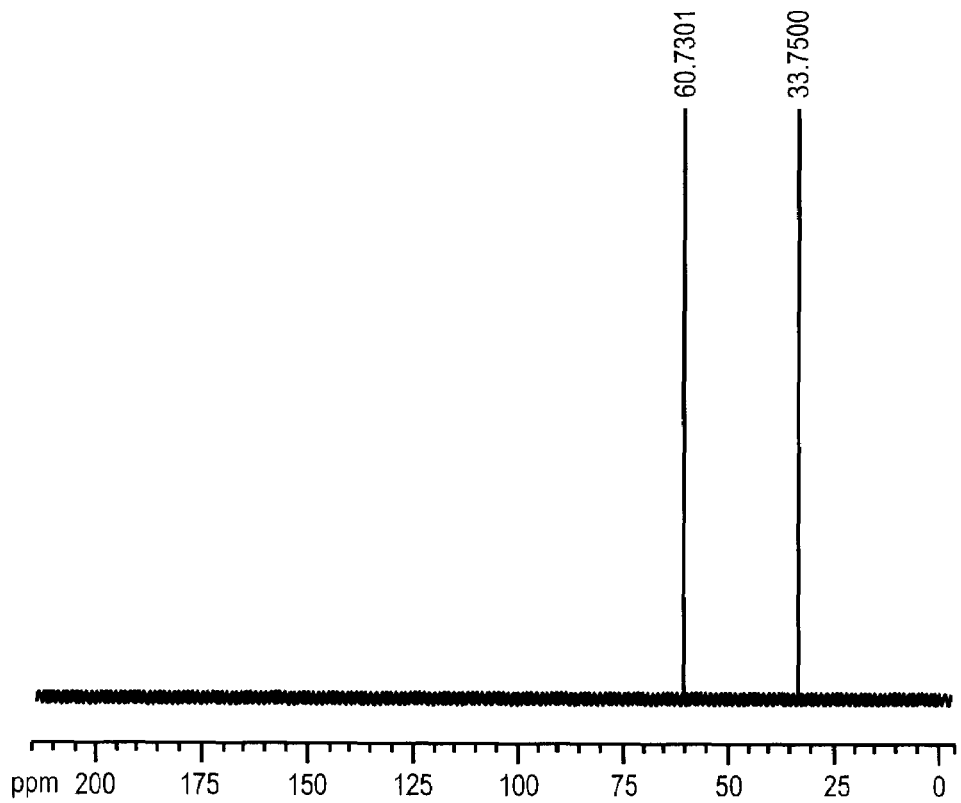
FIG. 8 is a $^{13}C$ NMR spectrum of thiodiglycol in combination with a photocatalyst prior to irradiation with visible light.
Figure 9:
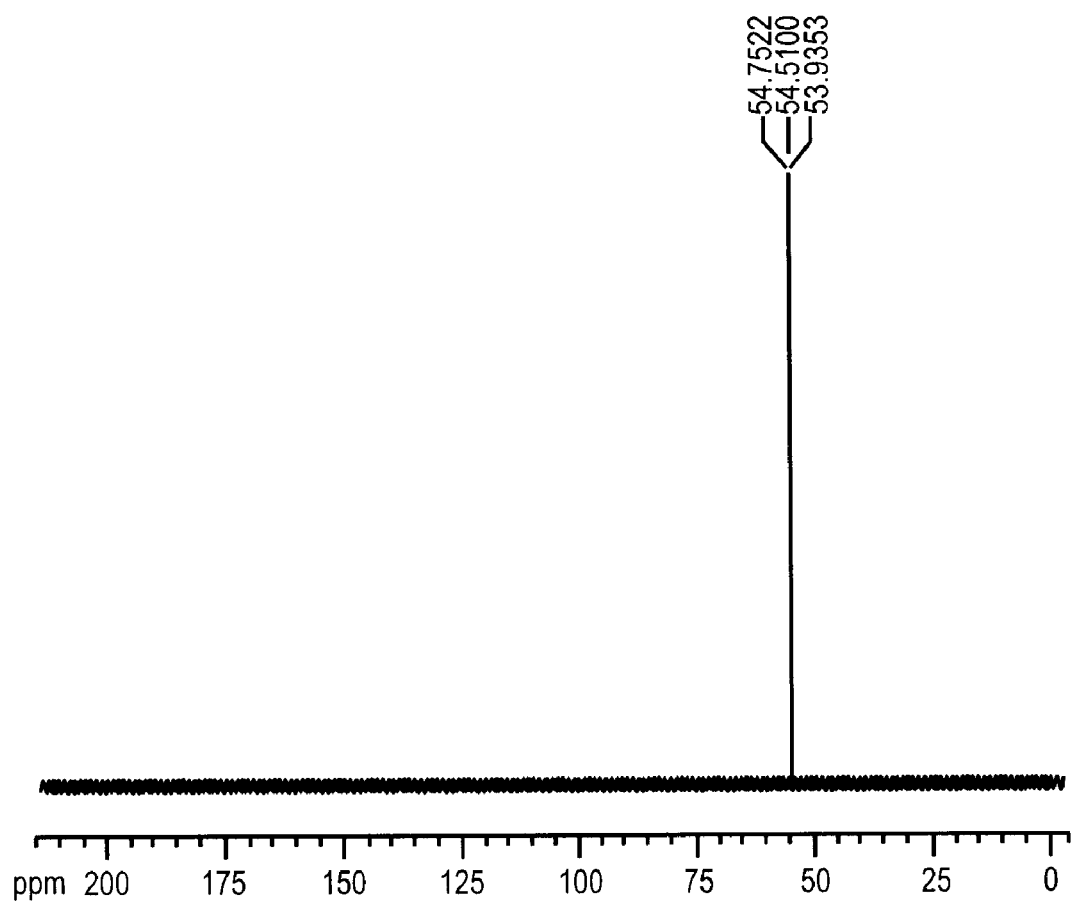
FIG. 9 is a $^{13}C$ NMR spectrum of thiodiglycol in combination with a photocatalyst after irradiation with visible light.

Referring now to FIGS. 8 and 9, $^{13}$C-NMR spectra of the photoproduct comport with the spectra reported for the sulfoxide formed by oxidation of thiodiglycol, where that sulfoxide shows NMR peaks downfield at 53-54 ppm. FIGS. 8 and 9 demonstrate that there is 99% consumption of sulfide after 15 minutes of irradiation and 100% consumption after 1 hour of irradiation.

Figure 10:
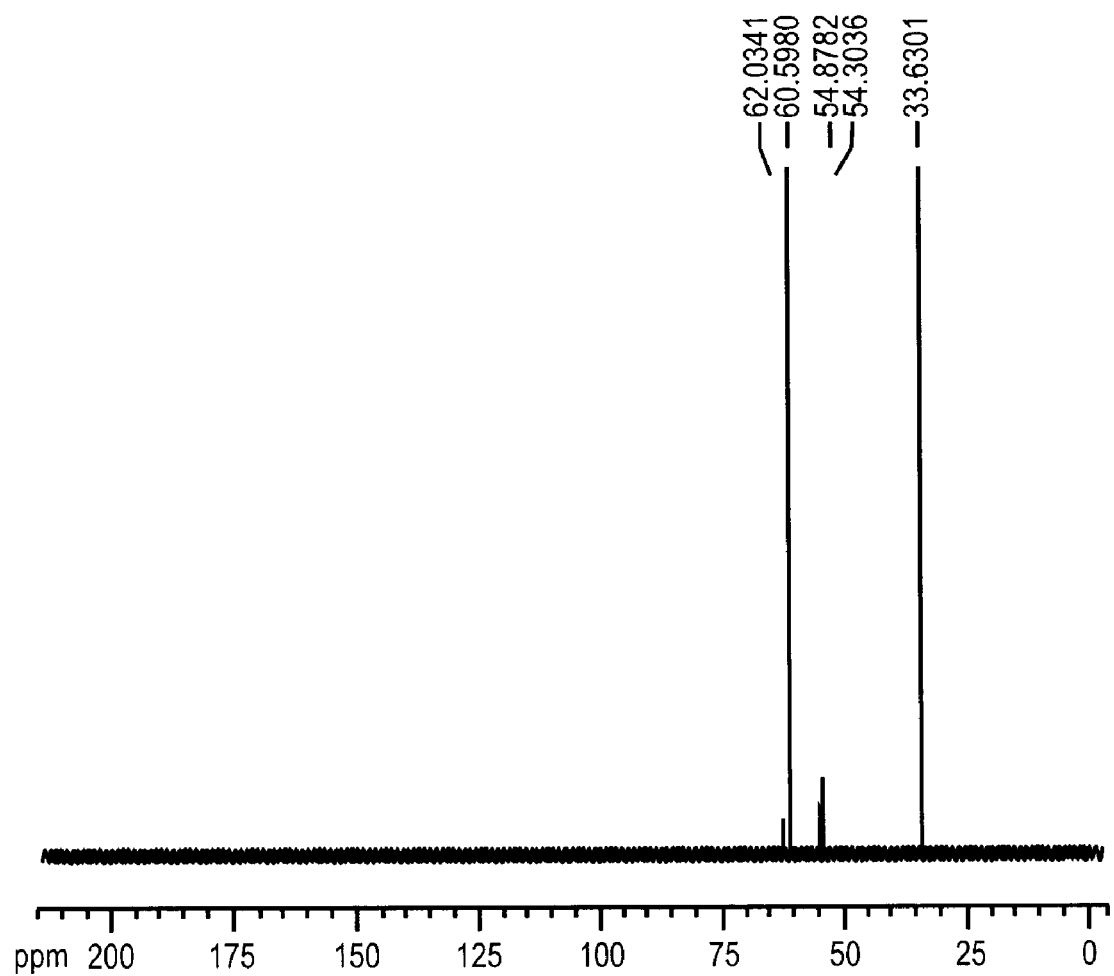
FIG. 10 is a $^{13}C$ NMR spectrum of thiodiglycol in combination with a photocatalyst in further combination with titanium dioxide after irradiation with visible light.

Similar photolysis experiments were carried out on aqueous TDG solutions containing conventional Degussa P-25 $TiO_2$ photocatalyst. No conversion of TDG to sulfoxide was measured via NMR spectroscopy was observed after 10 minute irradiation. Addition of Tinolux BBS to this solution followed by 10 minute irradiation gave only about a 7% sulfoxide conversion as seen in FIG. 10, below. Corresponding solutions containing only Tinolux had 13% conversion to sulfoxide, however, after a 10 minute irradiation. This was not surprising since the large 3.2 eV $TiO_2$ bandgap requires high energy UV irradiation ($\lambda$<400 nm) to generate the necessary electron-hole pairs required for titania's photocatalytic activity. These experiments used primarily visible light irradiation and hence the strongly absorbing Tinolux was a more active photocatalyst than titania. Since the solar spectrum consists of only about 3% of its wavelengths below 400 nm, it is understandable that $TiO_2$ is generally not significantly photoactive when exposed to sunlight. Hence this demonstrates the efficacy of Tinlous BBS and related metal phthalocyanines over $TiO_2$ as potential photocatalysts for CW agent barrier and decontamination use.

Experiment II

Experiment II further demonstrates the decontamination efficacy of aluminum phthalocyanine photocatalyst, i.e. Compound IV wherein M is aluminum, to photooxidize 2-chloroethyl ethyl sulfide ("CES"), compound V. CES comprises a mustard simulant. Applicant used CES to demonstrate the liability of the sulfide moiety to oxidization by singlet oxygen. Because Compound V, also known as "half mustard", has limited solubility in $D_2O$, deuterated dimethyl sulfoxide (DMSO-$d_6$) was instead employed as the solvent.

V

Figure 11:
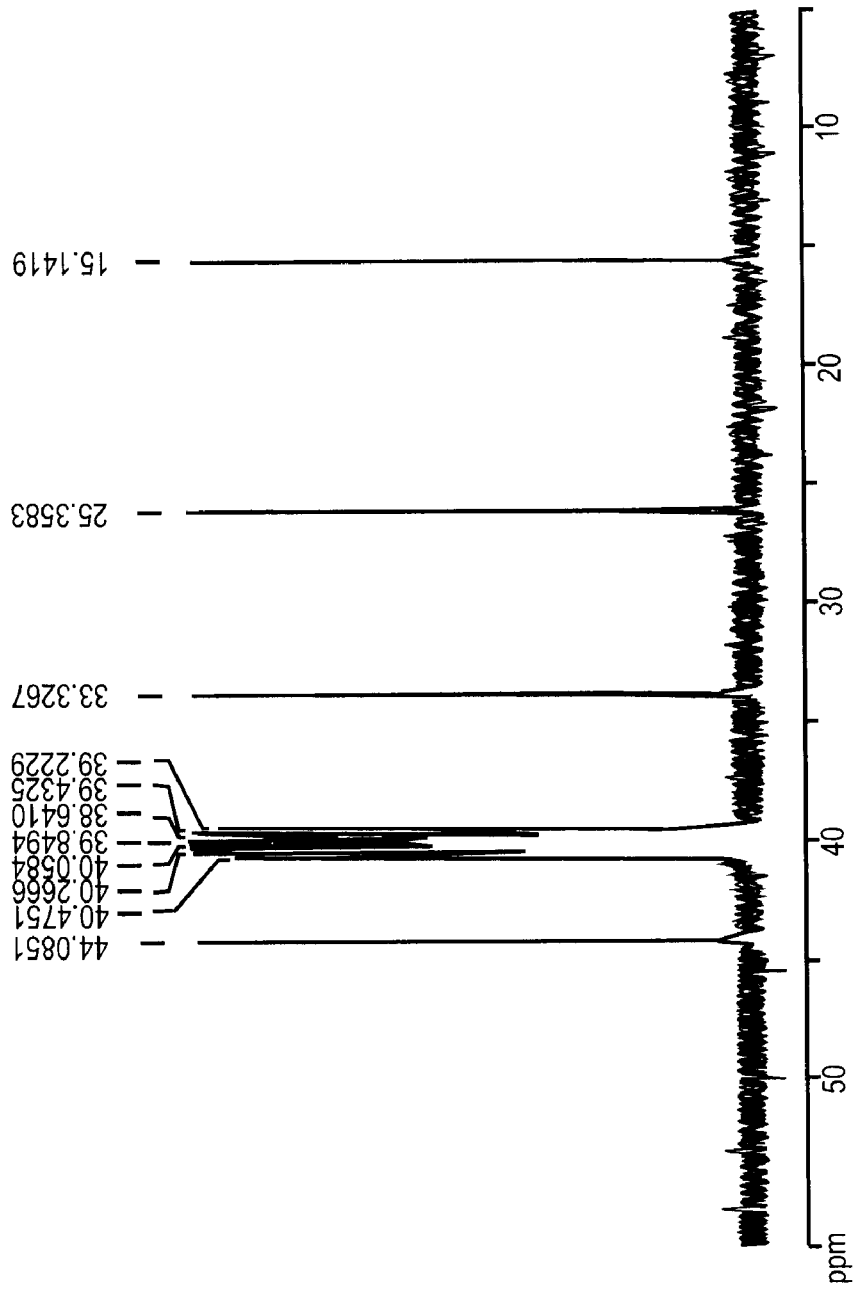
FIG. 11 is a $^{13}C$ NMR spectrum of 2-chloroethyl ethyl sulfide in combination with an aluminum phthalocyanine photocatalyst prior to irradiation with visible light.
Figure 12:
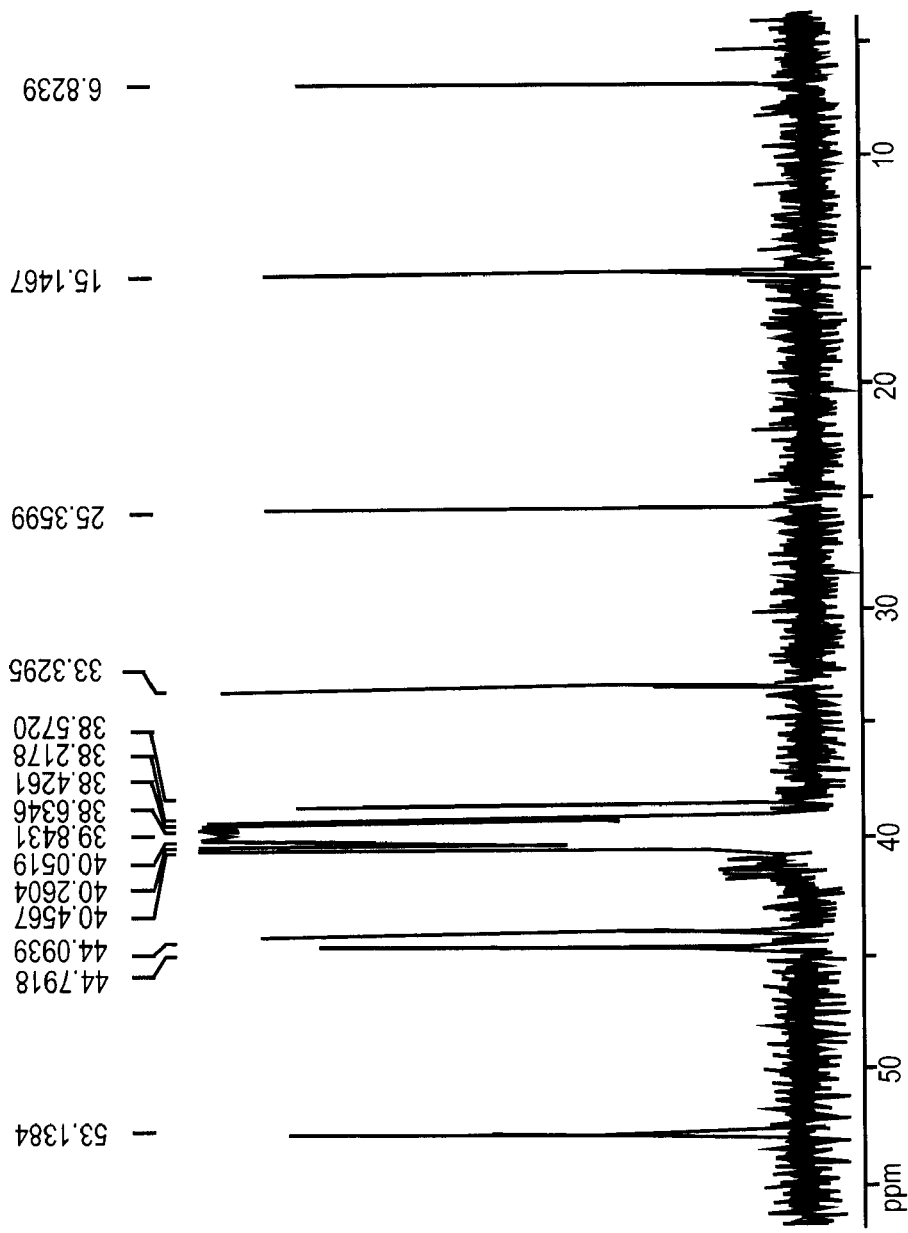
FIG. 12 is a $^{13}C$ NMR spectrum of 2-chloroethyl ethyl sulfide in combination with an aluminum phthalocyanine photocatalyst after irradiation with visible light.

A DMSO-$d_6$ solution that contained CES (0.17 M) and aluminum phthalocyanine photocatalyst (saturated solution: <$5\times10^{-4}$ M) was prepared. A sample of the solution was transferred to an NMR tube and its $^1$H and $^{13}$C NMR spectra were recorded FIG. 11 comprises the $^{13}$C NMR spectrum of that solution. The tube was then irradiated for 30 minutes with visible light in the presence of $O_2$ and the spectra were again recorded FIG. 12 shows the $^{13}$C NMR spectrum after irradiation. It should be noted that the strong features at ~40 ppm are due to the solvent. Referring now to TABLE 1, and FIGS. 11 and 12, this Experiment II shows that a significant portion of the sulfide simulant V was oxidized to the sulfoxide, i.e. Compound VI, using Applicant's Compound IV, wherein M is aluminum.

VI

To insure that oxidative decontamination of Compound V in this Experiment II was effected by the catalyzed photo reaction and not the result of a dark reaction with oxygen, a fresh solution was prepared and oxygen was bubbled into it for 30 minutes in the absence of light. It was observed that the $^1$H and $^{13}$C NMR spectra of this sample were identical to that of a freshly prepared non-irradiated solution that had not had oxygen bubbled through it.

TABLE 1

$^{13}C$ NMR chemical shifts (ppm) observed for CES and the sulfoxide of CES

|  | $CH_3CH_2S$ | $CH_3CH_2S$ | $SCH_2CH_2Cl$ | $SCH_2CH_2Cl$ |
|---|---|---|---|---|
| $CH_3CH_2SCH_2CH_2Cl$ | 15.1 | 25.3 | 33.3 | 44.1 |
| Lit. Value[1] | 15.1 | 26.2 | 33.9 | 43.4 |
| $CH_3CH_2SOCH_2CH_2Cl$ | 6.8 | 44.8 | 53.1 | 38.6 |
| Lit. Value[1] | 9.2 | 47.6 | 55.7 | 40.4 |

Experiments I and II demonstrate the efficacy of decontamination of sulfur-containing agents using singlet oxygen generated via visible light excitation of a metal phthalocyanines.

In certain embodiments, Applicant's barrier coating includes one or more photocatalysts, including without limitation the Pc complexes having structure IV described above, in combination with one or more compounds that function as singlet oxygen storage systems. In certain embodiments, Applicant's shelter coating composition includes 9,10-diphenylanthracene, compound VII.

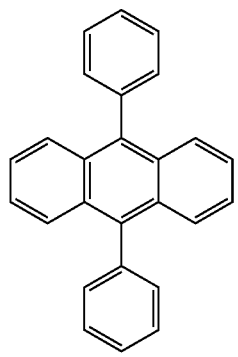

VII

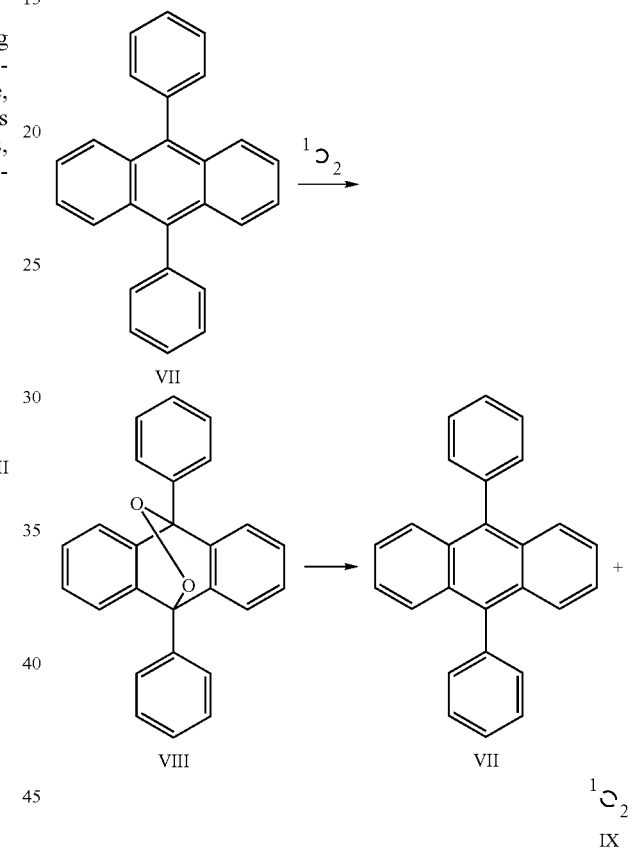

REACTION SCHEME "B"

In embodiments of Applicant's shelter coating that comprise one or more photocatalysts in combination with Compound VII, Applicant's shelter coating not only produces singlet oxygen to decontaminate CBAs, Applicant's shelter coating also stores a portion of the singlet oxygen produced, and releases that stored singlet oxygen over time using reaction scheme "B", below. Compound VII, i.e. 9,10-diphenylanthracene, reacts with singlet oxygen generated using Reaction Scheme "A", above, to form the 9,10-endoperoxide compound VIII. Endoperoxide VIII releases singlet oxygen, i.e. Compound IX, over time.

In other embodiments, Applicant's shelter coating composition comprises 3-(4-methyl-1-naphthylpropionic acid as a singlet oxygen scavenger. In these embodiments, the 3-(4-methyl-1-naphthylpropionic acid reacts with singlet oxygen produced using Reaction Scheme "A", above, to form endoperoxide X.

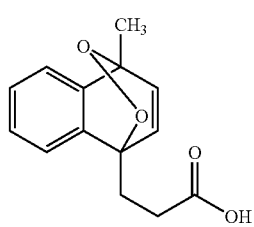

X

Endoperoxide X releases singlet oxygen IX over time.

In other embodiments, Applicant's shelter coating composition comprises 9,10-diphenylanthracene-2,3-dicarboxylic acid methyl ester as a singlet oxygen scavenger. In these embodiments, the 9,10-diphenylanthracene-2,3-dicarboxylic acid methyl ester reacts with singlet oxygen produced using Reaction Scheme "A", above, to form endoperoxide XI.

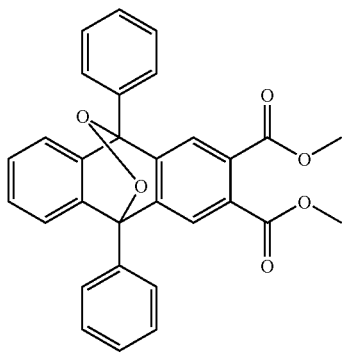

XI

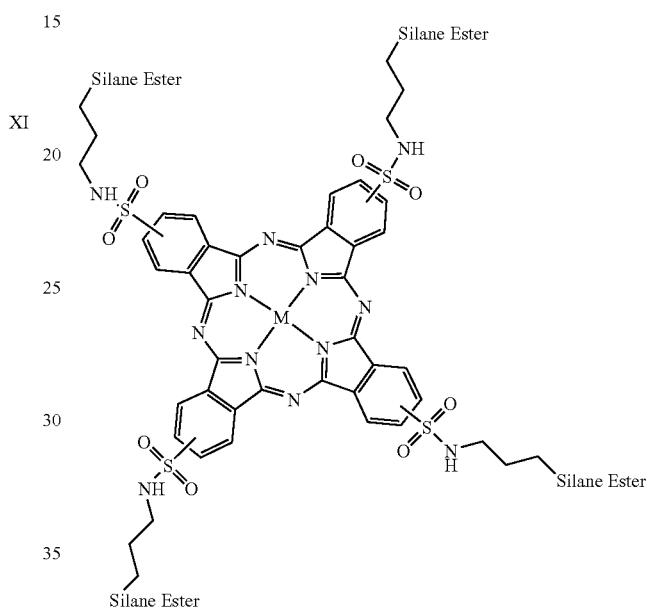

Endoperoxide XI releases singlet oxygen over time.

In other embodiments, Applicant's shelter coating includes rubrene, alkyl naphthalenes, stryryl anthracene copolymers, methyl substituted poly(vinylnaphthalenes, 2,5-diphenylfuran. As a general matter, 1,4-substituted naphthalenes having electron donating substitutents are preferred scavengers based upon their commercial availability and ability to reversibly re-generate singlet oxygen in high yield.

Embodiments of Applicant's shelter coating which include one or more Pc materials in combination with one or more singlet oxygen scavengers, Applicant's shelter coating produces singlet oxygen during daylight hours, wherein a portion of that singlet oxygen remains available to oxidize sulfur-containing CBAs, and wherein a portion of the singlet oxygen produced is scavenger, i.e. stored, by the one or more singlet oxygen scavengers which then release that stored singlet oxygen throughout the nighttime hours giving Applicant's coating a time-release CBA decontamination capability.

While the preferred embodiments of the present invention have been illustrated in detail, it should be apparent that modifications and adaptations to those embodiments may occur to one skilled in the art without departing from the scope of the present invention as set forth in the following claims.

I claim:

1. A shelter coating, comprising:

a polymeric material; and a photocatalyst capable of generating singlet oxygen, said photocatalyst comprising a structure:

disposed within said polymeric material;

wherein M is selected from a group consisting of Zn, Si, Ge, Cu, Al, and mixtures thereof.

2. The shelter coating of claim 1, wherein M is aluminum.

3. The shelter coating of claim 2, further comprising titanium dioxide.

4. The shelter coating of claim 1, wherein said photocatalyst is disposed on a surface of said shelter coating.

5. The shelter coating of claim 1, further comprising a singlet oxygen scavenger.

6. The shelter coating of claim 5, wherein said singlet oxygen scavenger is selected from the group comprising 9,10-diphenylanthracene; 3-(4-methyl-1-naphthyl)propionic acid; 9,10-diphenylanthracene-2,3-dicarboxylic acid methyl ester; rubrene; alkyl naphthalene; styryl anthracene copolymers; methyl substituted polyvinylnaphthalenes; and 2,5-diphenyl furan.

7. A shelter coating, comprising a photocatalyst capable of generating singlet oxygen comprising a structure:

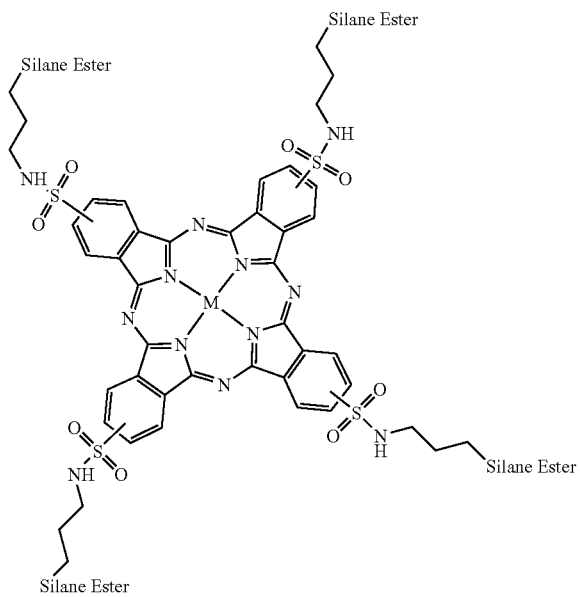

wherein M is selected from a group consisting of Zn, Si, Ge, Cu, Al, and mixtures thereof.

8. The shelter coating of claim 7, wherein:

said shelter coating further comprises a polymeric material comprising a carbon backbone;
said photocatalyst is dispersed within said polymeric material.

9. The shelter coating of claim 8, wherein said photocatalyst is disposed on a surface of said shelter coating.

10. The shelter coating of claim 8, wherein M is aluminum.

11. The shelter coating of claim 8, further comprising titanium dioxide.

12. The shelter coating of claim 8, further comprising a singlet oxygen scavenger.

13. The shelter coating of claim 12, wherein said singlet oxygen scavenger is selected from the group consisting of 9,10-diphenylanthracene; 3-(4-methyl-1-naphthyl)propionic acid; 9,10-diphenylanthracene-2,3-dicarboxylic acid methyl ester; rubrene; alkyl naphthalene; styryl anthracene copolymers; methyl substituted polyvinylnaphthalenes; and 2,5-diphenyl furan.

* * * * *